US009881423B2

(12) United States Patent
Cho et al.

(10) Patent No.: US 9,881,423 B2
(45) Date of Patent: Jan. 30, 2018

(54) AUGMENTED REALITY-BASED HAND INTERACTION APPARATUS AND METHOD USING IMAGE INFORMATION

(71) Applicant: ELECTRONICS AND TELECOMMUNICATIONS RESEARCH INSTITUTE, Daejeon (KR)

(72) Inventors: Hyun Woo Cho, Daejeon (KR); Young Woon Lee, Daejeon (KR); Sung Uk Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 12 days.

(21) Appl. No.: 15/006,322

(22) Filed: Jan. 26, 2016

(65) Prior Publication Data

US 2016/0364912 A1 Dec. 15, 2016

(30) Foreign Application Priority Data

Jun. 15, 2015 (KR) ........................ 10-2015-0084216

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/017* (2013.01); *G06F 3/0304* (2013.01);
(Continued)

(58) Field of Classification Search
CPC ...... G06T 19/006; G06T 7/73; G06K 9/00201
See application file for complete search history.

(56) References Cited

U.S. PATENT DOCUMENTS 8,405,680 B1 * 3/2013 Cardoso Lopes ....... G06T 19/00
345/426
8,948,461 B1 * 2/2015 Broadhurst ........ G06K 9/00201
382/106
(Continued)

FOREIGN PATENT DOCUMENTS

KR 10-2012-0040818 A 4/2012
KR 10-2012-0086266 A 8/2012
KR 10-1426378 B1 8/2014

*Primary Examiner* — Thomas Lett
(74) *Attorney, Agent, or Firm* — LRK Patent Law Firm (57) ABSTRACT

An augmented reality-based hand interaction apparatus and method using image information. The augmented reality-based hand interaction apparatus using image information includes an object recognition module configured to extract feature points from an input color image, recognize an object which is a target of interest based on the extracted feature points, and estimate a three-dimensional (3D) posture of the recognized object, and an interaction module configured to extract 3D mesh information from an input depth image, match 3D coordinates of the extracted 3D mesh information with 3D coordinates of the object recognized by the object recognition module to extract 3D position information of the recognized object in 3D space, and detect whether or not an augmented 3D object and the recognized object collide with each other based on relative positional relationship information between the recognized object and the augmented 3D object.

18 Claims, 5 Drawing Sheets

(51) Int. Cl.
    *G06T 7/20*     (2017.01)
    *G06K 9/00*     (2006.01)
    *G06K 9/46*     (2006.01)
    *G06F 3/03*     (2006.01)

(52) U.S. Cl.
    CPC ..... *G06K 9/00214* (2013.01); *G06K 9/00382* (2013.01); *G06K 9/4671* (2013.01); *G06T 7/20* (2013.01)

(56) References Cited

U.S. PATENT DOCUMENTS

| | | | | |
|---|---|---|---|---|
| 2010/0091096 | A1* | 4/2010 | Oikawa | G06F 3/011 348/53 |
| 2011/0069866 | A1* | 3/2011 | Kim | G06K 9/00369 382/103 |
| 2014/0002444 | A1* | 1/2014 | Bennett | G06F 3/012 345/419 |
| 2014/0015831 | A1 | 1/2014 | Kim et al. | |
| 2015/0061998 | A1 | 3/2015 | Yang et al. | |
| 2016/0071318 | A1* | 3/2016 | Lee | G06T 17/00 345/419 |

\* cited by examiner

AUGMENTED REALITY-BASED HAND INTERACTION APPARATUS AND METHOD USING IMAGE INFORMATION

CROSS-REFERENCE TO RELATED APPLICATION

This application claims priority to and the benefit of Korean Patent Application No. 10-2015-0084216, filed on Jun. 15, 2015, the disclosure of which is incorporated herein by reference in its entirety.

BACKGROUND

1. Field of the Invention

The present invention relates to an augmented reality-based hand interaction apparatus and method using image information, and more particularly, to an augmented reality-based hand interaction apparatus and method using image information which enable an image-based augmented reality system to provide intuitional interaction between an augmented three-dimensional (3D) virtual object and a user.

2. Discussion of Related Art

User interfaces (UIs) used in two-dimensional (2D) planes are employed as UIs used in existing 3D televisions (TVs), augmented reality, and virtual reality as they are, and may be used in a virtual touch manner or used by moving a cursor.

In augmented reality or virtual reality, menus are in the form of icons and managed in a folder or another screen, that is, in an upper level. Also, it is possible to see sub-items of the corresponding menu in a drag-and-drop manner or by means of selection.

Meanwhile, an augmented reality system according to related art provides the sense of immersion by synchronizing virtual content with real space. However, when such a physical interaction device is used, interaction with a user does not occur in augmented three dimensions, but input/output is performed through a display, so that the sense of immersion is lost.

As other related art, there is an interaction technique for recognizing a hand based on a red, green, and blue (RGB) image. According to this technique, a hand region is found in an RGB image using a skin color model, and a misrecognition occurs when a color similar to a skin color is included in an object which is a target of augmented reality.

Also, after a hand is specified using an RGB image alone, coordinates of a fingertip, the center of the hand, etc. are found. Therefore, it is neither possible to know an accurate 3D position nor to produce occlusion effects between pieces of augmented 3D content.

SUMMARY OF THE INVENTION

The present invention is directed to providing an apparatus and method for providing intuitive interaction between augmented virtual content and a user using the user's hand in an image-based augmented reality system using a camera and a display, and an apparatus and method for displaying occlusion of content resulting from hand interaction in a convincing way.

The present invention is also directed to providing an augmented reality-based hand interaction apparatus and method for extracting a mesh from a depth image and calibrating the mesh with a red, green, and blue (RGB) camera to provide intuitive interaction using a user's hand, and producing mesh-based occlusion effects to improve the sense of immersion in an existing augmented reality system.

The technical objectives of the present invention are not limited to the above disclosure; other objectives may become apparent to those of ordinary skill in the art based on the following descriptions.

According to an aspect of the present invention, there is provided an augmented reality-based hand interaction apparatus using image information, the apparatus including: an object recognition module configured to extract feature points from an input color image, recognize an object which is a target of interest based on the extracted feature points, and estimate a three-dimensional (3D) posture of the recognized object; and an interaction module configured to extract 3D mesh information from an input depth image, match 3D coordinates of the extracted 3D mesh information with 3D coordinates of the object recognized by the object recognition module to extract 3D position information of the recognized object in 3D space, and detect whether or not an augmented 3D object and the recognized object collide with each other based on relative positional relationship information between the recognized object and the augmented 3D object.

The object recognition module may track a movement path of the recognized object in consecutive input color image frames, extract new feature points from an input color image when tracking of the movement path of the recognized object fails, and recursively perform object recognition, 3D posture estimation, and object tracking based on the newly extracted feature points.

The interaction module may calculate 3D position coordinates of a mesh corresponding to the recognized object, a movement direction vector of the mesh, and a speed of the mesh, and calculate a direction and a position of a collision between the recognized object and the augmented 3D object using the 3D position coordinates of the mesh, the movement direction vector of the mesh, and the speed of the mesh.

Also, the interaction module may track and observe the collision direction and position over time, and determine a motion state of the augmented 3D object using 3D coordinates, a movement direction vector, and a speed of the recognized object tracked and observed in real time, and the collision direction and position.

Here, the motion state may be any one motion of the augmented 3D object among a movement motion, a rotary motion, and a complex motion in which movement and rotation are made together.

Also, the interaction module may render a motion or a change in a shape of the augmented object corresponding to the determined motion state and display the rendered motion or change in the shape to a user.

Also, the interaction module may determine a back-and-forth positional relationship between the recognized object and the augmented 3D object with respect to a camera based on the relative positional relationship information between the recognized object and the augmented 3D object, render an object positioned forward first, and then render a region of an object positioned back excluding a region occluded by the object positioned forward.

Meanwhile, the object recognition module may include: a color image input unit configured to receive color image information of surroundings taken by a camera; a feature point extractor configured to extract the feature points that may be features of the image using pixels corresponding to an entire region or a predetermined region in the received color image information; an object recognizer configured to recognize the specific object in the color image by matching the extracted feature points with feature points extracted from a trained image; a posture estimator configured to calculate a rotation matrix or a translation matrix representing a relative positional relationship between the recognized object and the camera; and an object tracker configured to track the recognized object in consecutive input image flames.

Also, the interaction module may include: a depth image input unit configured to receive depth image information of surroundings taken by a depth camera; a depth image mesh generator configured to convert the input depth image into mesh information usable by a 3D rendering engine; a calibrator configured to calibrate a relative positional relationship between an RGB camera and the depth camera using initial posture information of the recognized object and match the 3D coordinates of a mesh obtained by modeling the recognized object and the 3D coordinates of the recognized object; a manipulation processor configured to detect whether or not the augmented 3D object and the recognized object collide with each other based on the relative positional relationship information between the recognized object and the augmented 3D object in the 3D space, and determine a motion state of the augmented 3D object using the 3D coordinates, a movement direction vector, and a speed of the recognized object, and a direction and position of the collision; and a manipulation state output unit configured to render a motion or a change in a shape of the augmented object corresponding to the determined motion state and display the rendered motion or change in the shape to a user.

Here, the manipulation state output unit may determine a back-and-forth positional relationship between the recognized object and the augmented 3D object with respect to a camera based on the relative positional relationship information between the recognized object and the augmented 3D object, render an object positioned forward first, and then render a region of an object positioned back excluding a region occluded by the object positioned forward.

According to another aspect of the present invention, there is provided an augmented reality-based hand interaction method using image information, the method including: extracting feature points from an input color image, recognizing an object which is a target of interest based on the extracted feature points, and estimating a 3D posture of the recognized object; extracting 3D mesh information from an input depth image; matching 3D coordinates of the extracted 3D mesh information with 3D coordinates of the recognized object; extracting 3D position information of the recognized object in 3D space, and detecting whether or not an augmented 3D object and the recognized object collide with each other based on relative positional relationship information between the recognized object and the augmented 3D object; and when it is detected that the augmented 3D object and the recognized object collide with each other, determining a motion state of the augmented 3D object, and rendering a motion or a change in a shape of the augmented object corresponding to the determined motion state.

The estimating of the 3D posture of the recognized object may further include tracking a movement path of the recognized object in consecutive input color image frames, and when tracking of the movement path of the recognized object fails, extracting new feature points from an input color image and recursively performing object recognition, 3D posture estimation, and object tracking based on the newly extracted feature points.

The estimating of the 3D posture of the recognized object may include calculating a rotation matrix or a translation matrix representing a relative positional relationship between the recognized object and a camera.

The extracting of the 3D mesh information may include: extracting a bounding volume of a 3D polygon mesh; dividing the bounding volume into 3D grids using a plurality of sampling lines; extracting vertices of the 3D grids meeting the 3D polygon mesh among vertices of the 3D grids as valid vertices; and calculating depth information of the respective valid vertices using vertices of the 3D polygon mesh and modeling the recognized object using the depth information of the valid vertices.

The detecting of whether or not the augmented 3D object and the recognized object collide with each other may include: calculating 3D position coordinates of a mesh corresponding to the recognized object, a movement direction vector of the mesh, and a speed of the mesh; and calculating a direction and a position of a collision between the recognized object and the augmented 3D object using the 3D position coordinates of the mesh, the movement direction vector of the mesh, and the speed of the mesh.

The detecting of whether or not the augmented 3D object and the recognized object collide with each other may further include tracking and observing the collision direction and position over time, and determining a motion state of the augmented 3D object using 3D coordinates, a movement direction vector, and a speed of the recognized object tracked and observed in real time, and the collision direction and position.

The rendering of the motion or the change in the shape of the augmented object may include rendering any one of a movement motion of the augmented 3D object, a rotary motion of the augmented 3D object, and a complex motion of the augmented 3D object in which movement and rotation are made together.

The rendering of the motion or the change in the shape of the augmented object may include: determining a back-and-forth positional relationship between the recognized object and the augmented 3D object with respect to a camera based on the relative positional relationship information between the recognized object and the augmented 3D object; and rendering an object positioned forward first, and then rendering a region of an object positioned back excluding a region occluded by the object positioned forward.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and a method of achieving the same will be more clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Meanwhile, the terminology used herein is for the purpose of describing the embodiments and is not intended to be limiting of the invention. As used in this specification, the singular form of a word includes the plural unless the context clearly indicates otherwise. The term "comprise" and/or "comprising," when used herein, does not preclude the presence or addition of one or more components, steps, operations, and/or elements other than stated components, steps, operations, and/or elements.

Hereinafter, exemplary embodiments of the present invention will be described in detail with reference to the accompanying drawings. Throughout the specification, like reference numerals refer to like elements. In describing the present invention, any detailed description of known technology or function will be omitted if it is deemed that such a description will obscure the gist of the invention unintentionally.

Figure 1:
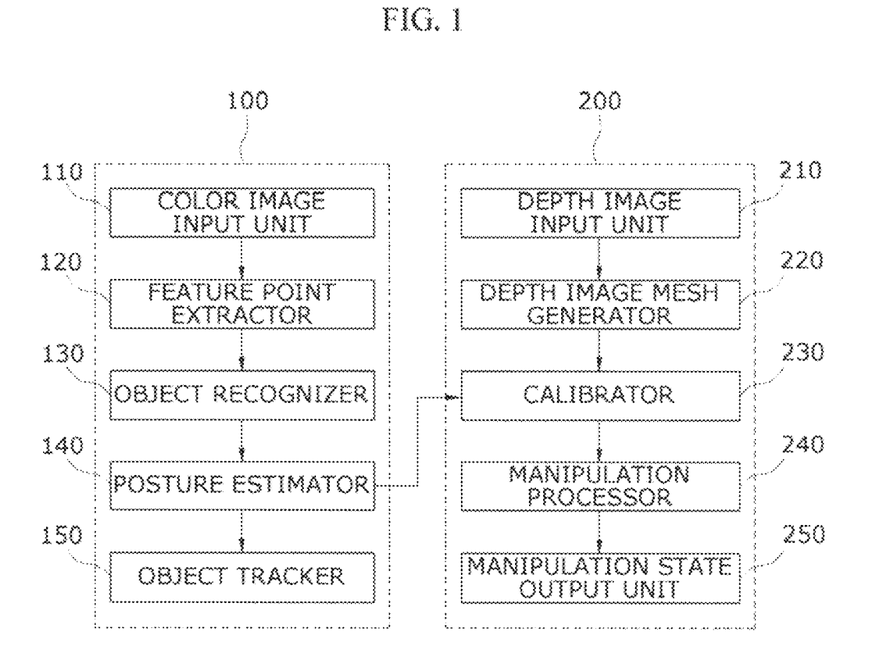
FIG. 1 is a block diagram showing a configuration of an augmented reality-based hand interaction apparatus using image information according to an exemplary embodiment of the present invention.

FIG. 1 is a block diagram showing a configuration of an augmented reality-based hand interaction apparatus using image information according to an exemplary embodiment of the present invention.

Referring to FIG. 1, an augmented reality-based hand interaction apparatus using image information according to an exemplary embodiment of the present invention may include an object recognition module 100 and an interaction module 200.

The object recognition module 100 extracts feature points from an input color image, recognizes an object which is a target of interest based on the extracted feature points, and estimates a three-dimensional (3D) posture of the recognized object (a 3D posture between the object and a camera).

The interaction module 200 extracts 3D mesh information from an input depth image.

The interaction module 200 extracts 3D position information of the recognized object in 3D space by matching 3D coordinates of the extracted 3D mesh information with 3D coordinates of the object estimated by the object recognition module 100.

Also, the interaction module 200 detects whether or not an augmented 3D object and a region of a person's hand collide with each other based on relative positional relationship information between the recognized object (e.g., the region of the person's hand) and the augmented 3D object in the 3D space. For example, when it is determined that the region of the person's hand collides with (or contacts) the augmented 3D object, the interaction module 200 processes a motion of the augmented 3D object according to a mesh collision direction and position of the hand region. Detailed configurations of the object recognition module 100 and the interaction module 200 will be described in detail below with reference to FIG. 1.

The object recognition module 100 may include a color image input unit 110, a feature point extractor 120, an object recognizer 130, a posture estimator 140, and an object tracker 150.

The color image input unit 110 receives color image information of surroundings taken by a camera. For example, a red, green, and blue (RGB) camera may be used as the camera acquiring the image information.

The feature point extractor 120 extracts feature points which may be features of the image in the received color image information using pixels corresponding to an entire region or a predetermined region. Here, the feature points denote corners and blobs. The feature points are vectors, and each of them is allocated a unique scale and direction. The feature points are configured relative to the scales and directions, and thus may be robust to scaling or rotational changes.

Typical feature point extraction algorithms are Scale Invariant Feature Transform (SIFT), Speeded Up Robust Feature (SURF), Features from Accelerated Segment Test (FAST), and so on.

The object recognizer 130 recognizes a specific object in the color image by matching the feature points extracted by the feature point extractor 120 with feature points extracted from a trained image. Matching of feature points is a process of comparing the feature points extracted from a training image with feature points extracted from an input color image to match most similar feature points with each other. Here since the feature points are k-dimensional vectors, a nearest neighbor search for finding the most similar feature point by measuring the degree of similarity between feature points is performed.

For example, when a distance which is a positional difference between matched feature points and an angle which is a directional difference between the matched feature points are smaller than predetermined threshold values, the matched feature points are considered correctly matched feature points. By applying these conditions to all matched feature points, the number of correctly matched feature points, that is, the number of verified feature points, is calculated, and an object corresponding to a training image having the largest number of verified feature points becomes a recognition result. Here, an algorithm, such as Randomized Fern, Gibbs Random Fields (GRF), etc. may be used for object recognition.

The posture estimator 140 calculates a rotation matrix and/or a translation matrix which represent a relative positional relationship between the recognized object and the camera. Here, the calculated rotation matrix and/or translation matrix are estimated as an initial posture of the recognized object.

Meanwhile, when a rotation matrix and/or a translation matrix related to the initial posture of the recognized object are calculated by the posture estimator 140, the object tracker 150 tracks the object in consecutive input image frames. When tracking of the object fails due to movement of the camera or occlusion, the feature point extractor 120 extracts new feature points from an input image, and processes including object recognition, posture estimation, object tracking, etc. are recursively performed.

The interaction module 200 may include a depth image input unit 210, a depth image mesh generator 220, a calibrator 230, a manipulation processor 240, and a manipulation state output unit 250.

The depth image input unit 210 receives depth image information of surroundings taken by a depth camera.

The depth image mesh generator 220 converts the depth image received by the depth image input unit 210 into mesh information which is usable by a 3D rendering engine.

Figure 2A:
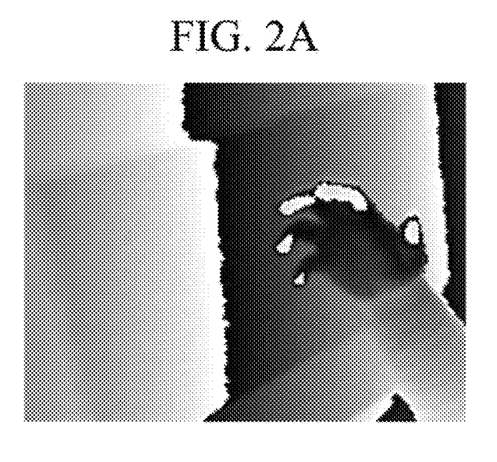
FIG. 2A and FIG. 2B shows example diagrams of a process of generating 3D mesh information from a depth image according to an exemplary embodiment of the present invention.
Figure 2B:
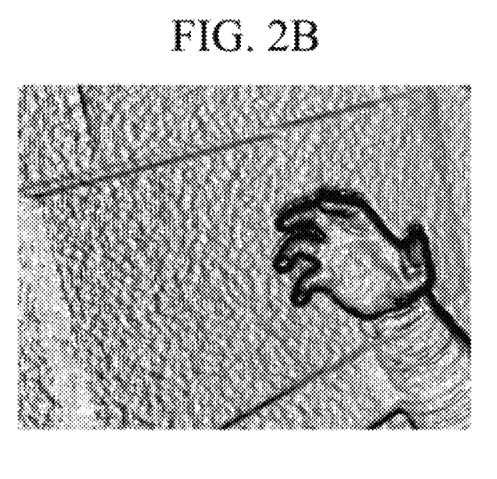

FIG. 2A and FIG. 2B shows an example of a process of generating 3D mesh information from a depth image according to an exemplary embodiment of the present invention. FIG. 2A shows a depth image input to the depth image input unit 210, and FIG. 2B shows a 3D mesh model generated from the depth image.

For example, according to a method of obtaining a 3D polygon mesh through modeling based on a depth image, a bounding volume of the 3D polygon mesh is extracted first.

Then, the extracted bounding volume is divided into 3D grids using a plurality of sampling lines, and vertices meeting the 3D polygon mesh among vertices of the 3D grids are extracted as valid vertices.

Subsequently, depth information of the respective extracted valid vertices is calculated using vertices of the 3D polygon mesh, and the 3D polygon mesh is modeled using the depth information of the valid vertices. The method of obtaining a 3D polygon mesh through modeling based on a depth image is a mere example, and exemplary embodiments of the present invention are not limited thereto.

The calibrator 230 receives initial posture information of the object estimated by the posture estimator 140, and calibrates a relative positional relationship between the RGB camera and the depth camera using the received initial posture information.

As a result of the calibration between the RGB camera and the depth camera, 3D coordinates of the mesh generated by the depth image mesh generator 220 and 3D coordinates of the object recognized by the object recognizer 130 we matched with each other and indicate the same position in the 3D space.

Based on relative positional relationship information between the recognized object (e.g., the region of the person's hand) and the augmented 3D object in the 3D space, the manipulation processor 240 detects whether or not the augmented 3D object and the region of the person's hand collide with each other.

The manipulation processor 240 calculates 3D coordinates (referred to as "3D coordinates of the hand region" below) of each 3D mesh obtained by modeling the object (e.g., the region of the person's hand) recognized by the object recognizer 130, a movement direction vector of each mesh, and a speed of each mesh. The calculated 3D coordinates, movement direction vector, and speed of the hand region are used to detect whether or not the region of the person's hand and the augmented 3D object collide with each other.

In an exemplary embodiment, the movement path of the region of the person's hand is tracked and observed by the manipulation processor 240, and it is determined that a collision has occurred when the relative distance between the region of the person's hand and the augmented 3D object becomes a preset threshold value or less.

When it is determined that a collision has occurred, the manipulation processor 240 calculates a position on the 3D object at which the collision has occurred and a collision direction, and changes of a position at which a collision occurs and a collision direction are also tracked and observed over time.

Figure 3A:
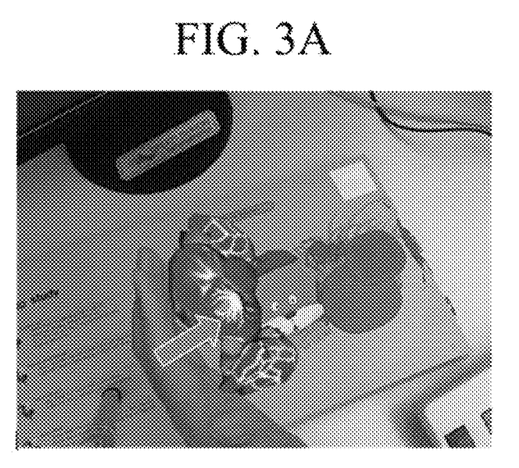
FIG. 3A and FIG. 3B shows example diagrams of interaction based on a collision between a three-dimensional (3D) virtual object and a hand region using 3D mesh information of the hand region according to an exemplary embodiment of the present invention.
Figure 3B:
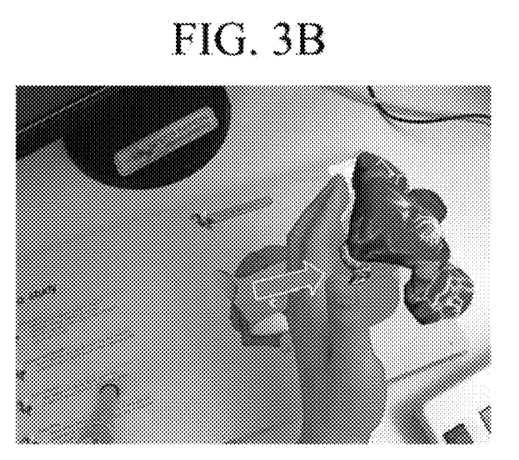

The manipulation state output unit 250 determines a motion state of the augmented 3D object using 3D coordinates, a movement direction vector, and a speed of the region of the person's hand which are tracked and observed in real time, a direction vector of a movement path of a collision point, and so on. Here, the motion state of the 3D object determined by the manipulation state output unit 250 may be a movement motion of a 3D object as shown in FIG. 3A and FIG. 3B or a complex motion in which movement and rotation are made together. The motion state of the 3D object determined as mentioned above is visually displayed to a user.

Also, the manipulation state output unit 250 performs occlusion-based rendering according to relative position information between the 3D coordinates of the hand region and the augmented 3D object. The rendering process may be performed as follows.

First, an object which is foremost in a depth direction from the camera (the depth camera or the RGB camera) is determined. Here, the foremost object may be the region of the person's hand or the augmented 3D object.

Next, 3D rendering of only the foremost object is performed. The manipulation state output unit 250 has the mesh information of the hand region. Therefore, when the region of the person's hand is positioned in front of the augmented 3D object, the manipulation state output unit 250 renders the region of the person's hand first and does not render the region of the augmented 3D object corresponding to the region of the person's hand. In this way, occlusion effects between the region of the person's hand and the augmented 3D object may be produced.

Figure 4A:
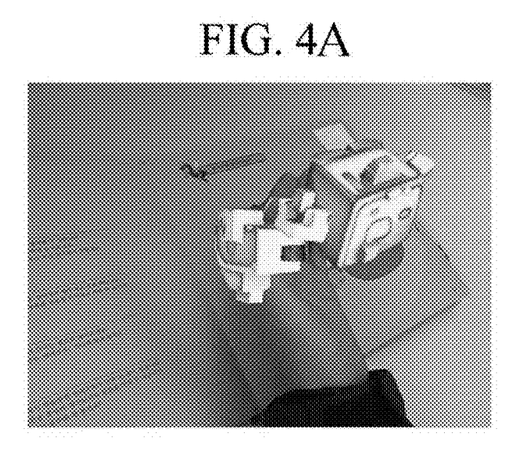
FIG. 4A and FIG. 4B shows example diagrams of a process of rendering occlusion between a 3D virtual object and a hand region using 3D mesh information of the hand region according to an exemplary embodiment of the present invention.
Figure 4B:
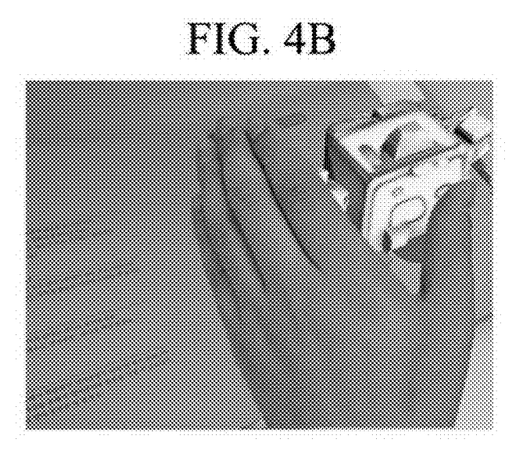

FIG. 4A and FIG. 4b shows an example of a process of rendering occlusion between a 3D virtual object and a hand region using 3D mesh information of the hand region according to an exemplary embodiment of the present invention. FIG. 4A shows an example in which a part of the region of a person's hand is occluded when an augmented 3D object is in front of the region of the person's hand because the augmented 3D object is rendered first and a partial region of the person's hand corresponding to the augmented 3D object is not rendered. Also, FIG. 4B shows an example in which a partial region of the augmented 3D object is occluded when the region of the person's hand is in front of the augmented 3D object because the region of the person's hand is rendered first and a partial region of the augmented 3D object corresponding to the region of the person's hand object is not rendered.

An augmented reality-based hand interaction method using image information according to an exemplary embodiment will be described in stages below with reference to FIG. 5. Descriptions identical to the descriptions of operation of the augmented reality-based hand interaction apparatus using image information according to an exemplary embodiment of the present invention made with reference to FIGS. 1 to 4 will be omitted.

Figure 5:
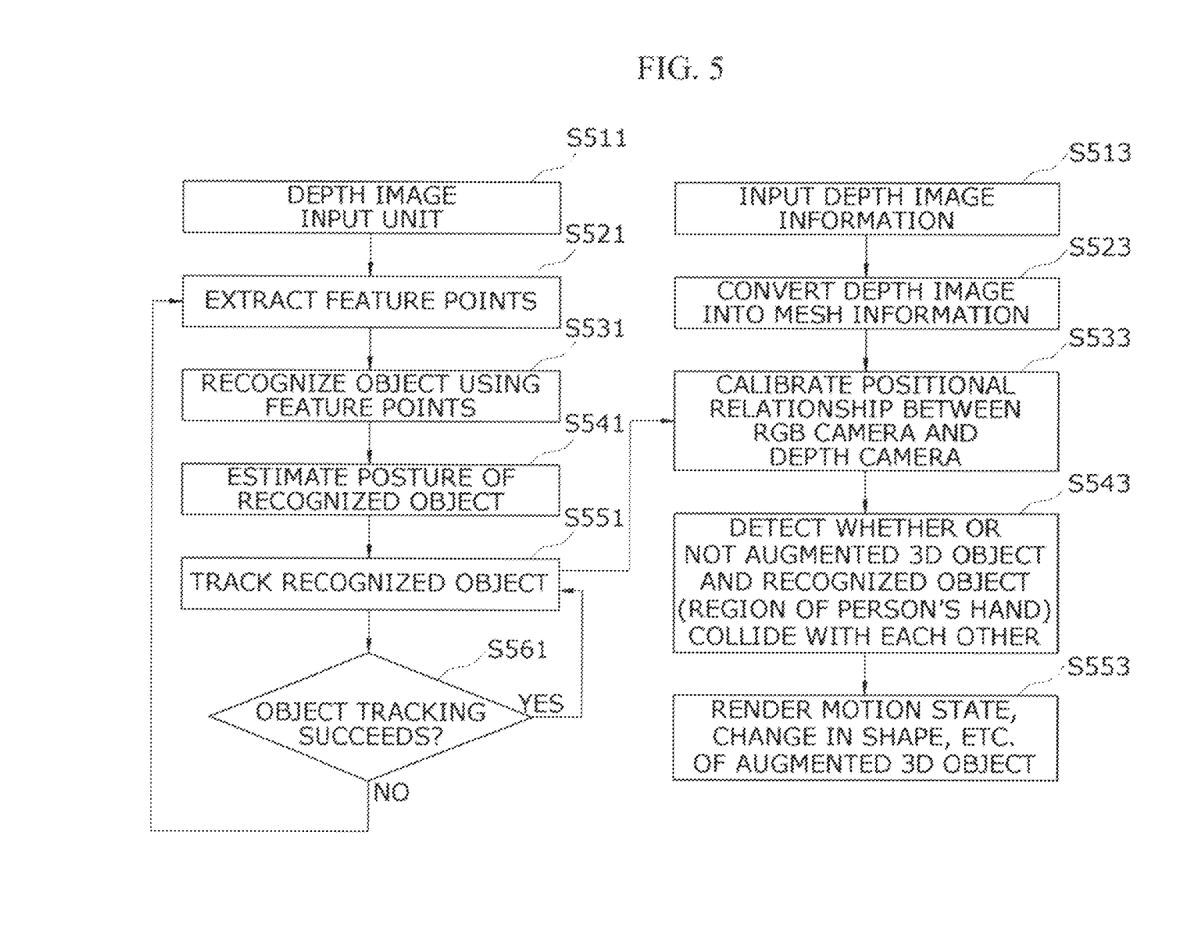
FIG. 5 is a flowchart illustrating an augmented reality-based hand interaction method using image information according to an exemplary embodiment of the present invention.

FIG. 5 is a flowchart illustrating an augmented reality-based hand interaction method using image information according to an exemplary embodiment of the present invention.

Referring to FIGS. 1 and 5, the object recognition module 100 receives color image information of surroundings taken by a camera (S511). For example, an RGB camera may be used as the camera acquiring the image information.

Subsequently, the object recognition module 100 extracts feature points which may be features of the image in the received color image information using pixels corresponding to an entire region or a predetermined region (S521).

Subsequently, the object recognition module 100 recognizes a specific object in the color image by matching the extracted feature points with feature points extracted from a trained image (S531). At this time, an algorithm, such as Randomized Fern, GRF, etc. may be used for object recognition.

The object recognition module 100 calculates a rotation matrix and/or a translation matrix which represent a relative positional relationship between the recognized object and the camera (S541). Here, the calculated rotation matrix and/or translation matrix are estimated as an initial posture of the recognized object.

Next, when a rotation matrix and/or a translation matrix related to the initial posture of the recognized object are calculated, the object recognition module 100 tracks the object in consecutive input image frames (S551).

The object recognition module 100 determines whether or not the object tracking succeeds (S561). When the object tracking fails due to movement of the camera or occlusion, the object recognition module 100 extracts new feature points from an input image, and recursively performs processes including object recognition, posture estimation, object tracking, and so on.

Meanwhile, the interaction module 200 receives depth image information of surroundings taken by a depth camera (S513).

Subsequently, the interaction module 200 converts the received depth image into mesh information which is usable by a 3D rendering engine (S523).

Subsequently, the interaction module 200 calibrates a relative positional relationship between the RGB camera and the depth camera using the initial posture information of the recognized object input from the object recognition module 100 (S533).

As a result of the calibration between the RGB camera and the depth camera, 3D coordinates of a mesh generated by the interaction module 200 and 3D coordinates of the object recognized by the object recognition module 100 are matched with each other and indicate the same position in 3D space.

Based on relative positional relationship information between the recognized object (e.g., the region of a person's hand) and an augmented 3D object in the 3D space, the interaction module 200 detects whether or not the augmented 3D object and the region of the person's hand collide with each other (S543).

For example, the interaction module 200 calculates 3D coordinates of each 3D mesh obtained by modeling the recognized object (e.g., the region of the person's hand), a movement direction vector of each mesh, and a speed of each mesh, and uses the calculated 3D coordinates, movement direction vector, and speed of the hand region to detect whether or not the region of the person's hand and the augmented 3D object collide with each other.

Next, the interaction module 200 determines a motion state of the augmented 3D object using 3D coordinates, a movement direction vector, and a speed of the region of the person's hand which are tracked and observed in real time, a direction vector of a movement path of a collision point, etc., and renders the determined motion state (S553).

Here, the determined motion state of the 3D object may be a movement motion of a 3D object as shown in FIG. 3 or a complex motion in which movement and rotation are made together. The motion state of the 3D object determined as mentioned above is visually displayed to a user.

Also, the interaction module 200 performs occlusion-based rendering according to relative position information between the 3D coordinates of the hand region and the augmented 3D object.

According to exemplary embodiments of the present invention, it is possible not only to intuitively interact with an augmented 3D virtual object using a hand, but also to produce occlusion effects which cannot be produced by an existing augmented reality system.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An augmented reality-based hand interaction apparatus using image information, the apparatus comprising:
   a processor;
   an object recognition module comprising the processor, the processor being configured to implement instructions so that the object recognition module is configured to extract feature points from an input color image, recognize an object that is a target of interest based on the extracted feature points, and estimate a three-dimensional (3D) posture of the recognized object; and
   an interaction module comprising the processor, the processor being configured to implement instructions so that the interaction module configured to extract 3D mesh information from an input depth image, match 3D coordinates of the extracted 3D mesh information with 3D coordinates of the object recognized by the object recognition module to extract 3D position information of the recognized object in 3D space, and detect whether or not an augmented 3D object and the recognized object collide with each other based on relative positional relationship information between the recognized object and the augmented 3D object.

2. The augmented reality-based hand interaction apparatus of claim 1, wherein the object recognition module tracks a movement path of the recognized object in consecutive input color image frames, extracts new feature points from an input color image when tracking of the movement path of the recognized object fails, and recursively performs object recognition, 3D posture estimation, and object tracking based on the extracted new feature points.

3. The augmented reality-based hand interaction apparatus of claim 1, wherein the interaction module calculates 3D position coordinates of a mesh corresponding to the recognized object, a movement direction vector of the mesh, and a speed of the mesh, and calculates a direction and a position of a collision between the recognized object and the augmented 3D object using the 3D position coordinates of the mesh, the movement direction vector of the mesh, and the speed of the mesh.

4. The augmented reality-based hand interaction apparatus of claim 3, wherein the interaction module tracks and observes the collision direction and position over time, and determines a motion state of the augmented 3D object using 3D coordinates, a movement direction vector, and a speed of the recognized object tracked and observed in real time, and the collision direction and position.

5. The augmented reality-based hand interaction apparatus of claim 4, wherein the motion state is any one motion of the augmented 3D object among a movement motion, a rotary motion, and a complex motion in which movement and rotation are made together.

6. The augmented reality-based hand interaction apparatus of claim 4, wherein the interaction module renders a motion or a change in a shape of the augmented object corresponding to the determined motion state and displays the rendered motion or change in the shape to a user.

7. The augmented reality-based hand interaction apparatus of claim 1, wherein the interaction module determines a back-and-forth positional relationship between the recognized object and the augmented 3D object with respect to a camera based on the relative positional relationship information between the recognized object and the augmented 3D object, renders an object positioned forward first, and then renders a region of an object positioned back excluding a region occluded by the object positioned forward.

8. The augmented reality-based hand interaction apparatus of claim 1,
wherein the object recognition module comprises: a color image input unit comprising the processor, the processor being configured to implement instructions so that the color image input unit is configured to receive color image information of surroundings taken by a camera;
a feature point extractor comprising the processor, the processor being configured to implement instructions so that the feature point extractor is configured to extract the feature points that may be features of the image using pixels corresponding to an entire region or a predetermined region in the received color image information;
an object recognizer comprising the processor, the processor being configured to implement instructions so that the object recognizer is configured to recognize a specific object in the color image by matching the extracted feature points with feature points extracted from a trained image;
a posture estimator comprising the processor, the processor being configured to implement instructions so that the posture estimator is configured to calculate a rotation matrix or a translation matrix representing a relative positional relationship between the recognized object and the camera; and
an object tracker comprising the processor, the processor being configured to implement instructions so that the object tracker is configured to track the recognized object in consecutive input image frames.

9. The augmented reality-based hand interaction apparatus of claim 1,
wherein the interaction module comprises:
a depth image input unit comprising the processor, the processor being configured to implement instructions so that the depth image input unit is configured to receive depth image information of surroundings taken by a depth camera;
a depth image mesh generator comprising the processor, the processor being configured to implement instructions so that the depth image mesh generator is configured to convert the input depth image into mesh information usable by a 3D rendering engine;
a calibrator comprising the processor, the processor being configured to implement instructions so that the calibrator is configured to calibrate a relative positional relationship between a red, green, and blue (RGB) camera and the depth camera using initial posture information of the recognized object and match the 3D coordinates of a mesh obtained by modeling the recognized object and the 3D coordinates of the recognized object;
a manipulation processor comprising the processor, the manipulator processor being configured to detect whether or not the augmented 3D object and the recognized object collide with each other based on the relative positional relationship information between the recognized object and the augmented 3D object in the 3D space, and determine a motion state of the augmented 3D object using the 3D coordinates, a movement direction vector, and a speed of the recognized object, and a direction and position of the collision; and
a manipulation state output unit comprising the processor, the processor being configured to implement instructions so that the manipulation state output unit is configured to render a motion or a change in a shape of the augmented object corresponding to the determined motion state and display the rendered motion or change in the shape to a user.

10. The augmented reality-based hand interaction apparatus of claim 9, wherein the manipulation state output unit determines a back-and-forth positional relationship between the recognized object and the augmented 3D object with respect to a camera based on the relative positional relationship information between the recognized object and the augmented 3D object, renders an object positioned forward first, and then renders a region of an object positioned back excluding a region occluded by the object positioned forward.

11. An augmented reality-based hand interaction method using image information, the method comprising:
extracting feature points from an input color image, recognizing an object that is a target of interest based on the extracted feature points, and estimating a three-dimensional (3D) posture of the recognized object;
extracting 3D mesh information from an input depth image;
matching 3D coordinates of the extracted 3D mesh information with 3D coordinates of the recognized object;
extracting 3D position information of the recognized object in 3D space, and
detecting whether or not an augmented 3D object and the recognized object collide with each other based on relative positional relationship information between the recognized object and the augmented 3D object; and
when it is detected that the augmented 3D object and the recognized object collide with each other, determining a motion state of the augmented 3D, rendering a motion or a change in a shape of the augmented object corresponding to the determined motion state, and displaying the rendered motion or change in the shape to a user.

12. The augmented reality-based hand interaction method of claim 11,
wherein the estimating of the 3D posture of the recognized object further comprises tracking a movement path of the recognized object in consecutive input color image frames, and when tracking of the movement path of the recognized object fails, extracting new feature points from an input color image and recursively performing object recognition, 3D posture estimation, and object tracking based on the newly extracted feature points.

13. The augmented reality-based hand interaction method of claim 11, wherein the estimating of the 3D posture of the recognized object comprises calculating a rotation matrix or a translation matrix representing a relative positional relationship between the recognized object and a camera.

14. The augmented reality-based hand interaction method of claim 11,
wherein the extracting, of the 3D mesh information comprises:
extracting a bounding volume of a 3D polygon mesh;
dividing the bounding volume into 3D grids using a plurality of sampling lines;
extracting vertices of the 3D grids meeting the 3D polygon mesh among vertices of the 3D grids as valid vertices; and
calculating depth information of the respective valid vertices using vertices of the 3D polygon mesh and modeling the recognized object using the depth information of the valid vertices.

15. The augmented reality-based hand interaction method of claim 11,
wherein the detecting of whether or not the augmented 3D object and the recognized object collide with each other comprises:
calculating 3D position coordinates of a mesh corresponding to the recognized object, a movement direction vector of the mesh, and a speed of the mesh; and
calculating a direction and a position of a collision between the recognized object and the augmented 3D object using the 3D position coordinates of the mesh, the movement direction vector of the mesh, and the speed of the mesh.

16. The augmented reality-based hand interaction method of claim 15,
wherein the detecting of whether or not the augmented 3D object and the recognized object collide with each other further comprises tracking and observing the collision direction and position overtime, and determining a motion state of the augmented 3D object using 3D coordinates, a movement direction vector, and a speed of the recognized object tracked and observed in real time, and the collision direction and position.

17. The augmented reality-based hand interaction method of claim 11, wherein the rendering of the motion or the change in the shape of the augmented object comprises rendering any one of a movement motion of the augmented 3D object, a rotary motion of the augmented 3D object, and a complex motion of the augmented 3D object in which movement and rotation are made together.

18. The augmented reality-based hand interaction method of claim 11, wherein the rendering of the motion or the change in the shape of the augmented object comprises:
determining a back-and-forth positional relationship between the recognized object and the augmented 3D object with respect to a camera based on the relative positional relationship information between the recognized object and the augmented 3D object; and
rendering an object positioned forward first, and then rendering a region of an object positioned back excluding a region occluded by the object positioned forward.

* * * * *